(12) United States Patent
Faruque et al.

(10) Patent No.: US 9,096,257 B1
(45) Date of Patent: Aug. 4, 2015

(54) EXTENSIBLE STEERING WHEEL FOR PASSIVE RESTRAINT SUPPORT

(71) Applicant: Ford Global Technologies, LLC, Dearborn, MI (US)

(72) Inventors: Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/319,048

(22) Filed: Jun. 30, 2014

(51) Int. Cl.
| | |
|---|---|
| *B62D 1/11* | (2006.01) |
| *B60R 21/017* | (2006.01) |
| *B60R 21/203* | (2006.01) |
| *B60R 21/00* | (2006.01) |
| *B60R 21/01* | (2006.01) |

(52) U.S. Cl.
CPC ............... *B62D 1/11* (2013.01); *B60R 21/017* (2013.01); *B60R 21/203* (2013.01); *B60R 2021/0009* (2013.01); *B60R 2021/01013* (2013.01)

(58) Field of Classification Search
CPC  B60R 21/203; B60R 21/2035; B60R 21/017; B60R 2021/0009; B60R 2021/01013; B62D 1/04; B62D 1/06; B62D 1/11
See application file for complete search history.

(56) References Cited

U.S. PATENT DOCUMENTS

| | | | | | |
|---|---|---|---|---|---|
| 2,311,317 | A | * | 2/1943 | Tegarty | 74/552 |
| 2,889,714 | A | * | 6/1959 | Romano | 74/493 |
| 7,441,799 | B2 | * | 10/2008 | Enders et al. | 280/731 |
| 8,079,615 | B2 | * | 12/2011 | Tanaka | 280/743.2 |
| 2002/0035889 | A1 | * | 3/2002 | Lorenz | 74/552 |
| 2007/0024035 | A1 | * | 2/2007 | Yamachi et al. | 280/731 |
| 2008/0023254 | A1 | * | 1/2008 | Prost-Fin et al. | 180/400 |

FOREIGN PATENT DOCUMENTS

| | | |
|---|---|---|
| DE | 19923483 A1 | 11/2000 |
| JP | 200426027 A | 1/2004 |
| JP | 2007290686 A | 11/2007 |
| JP | 2008201251 A | 9/2008 |
| JP | 201347026 A | 3/2013 |

* cited by examiner

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

A plurality of steering wheel sections can be joined to form a steering wheel. A member is partially disposed within a first steering wheel section cavity and partially disposed within a second steering wheel section cavity. A plurality of support arms each have disposed therein a support arm extension. At least one separation mechanism is configured to break a joint between first and second steering wheel sections.

20 Claims, 4 Drawing Sheets

EXTENSIBLE STEERING WHEEL FOR PASSIVE RESTRAINT SUPPORT

BACKGROUND

Oblique impacts cause particular risks for vehicle occupants. An oblique impact is one in which a vehicle strikes another object at an angle, e.g., at an angle of a longitudinal axis of the vehicle with respect to the object, e.g., the angle being approximately 15 degrees. When an oblique impact occurs at a front of a vehicle, a vehicle occupant may move at an angle with respect to the longitudinal axis of the vehicle. That is, when an oblique impact occurs, the vehicle occupant may be moved in a direction determined by the angle of impact, i.e., the occupant or at least the occupant's head and/or upper body, may be moved in a direction at the angle to the longitudinal axis of the vehicle of the oblique impact. Accordingly, vehicle safety mechanisms (e.g., a restraint system) that protect an occupant in the case of a head-on collision may provide less or inadequate protection in the case of an oblique impact.

For example, a driver airbag (DAB), e.g., deployed from a vehicle steering wheel, may provide inadequate protection for the driver upon an oblique impact. In a non-oblique impact, e.g., a head-on collision, a DAB, upon being deployed, may be impacted by the driver's head in or near a center of the airbag, whereby the airbag will generally be supported by the vehicle steering wheel directly. However, in the case of an oblique impact, the driver's head may strike the airbag (e.g., the DAB) at a less than 90 degree angle causing the head to rotate outward and slip off the airbag completely. In this case, the steering wheel will provide inadequate support for the airbag, and the driver is more likely to suffer a head injury and/or a suffered head injury may be more severe.

DRAWINGS

FIG. 1 is a perspective view of an example of a steering wheel system including an extensible steering wheel in a non-extended state.

FIG. 2. is a perspective view of the steering wheel system of FIG. 1 illustrating the extensible steering wheel in an extended state.

Figure 1:
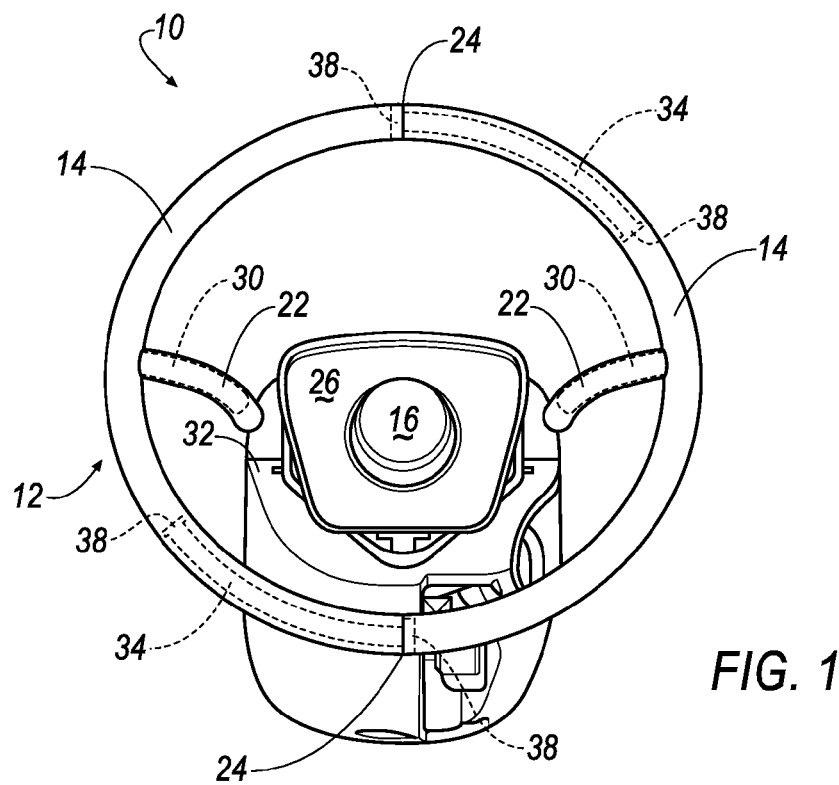
Figure 7:
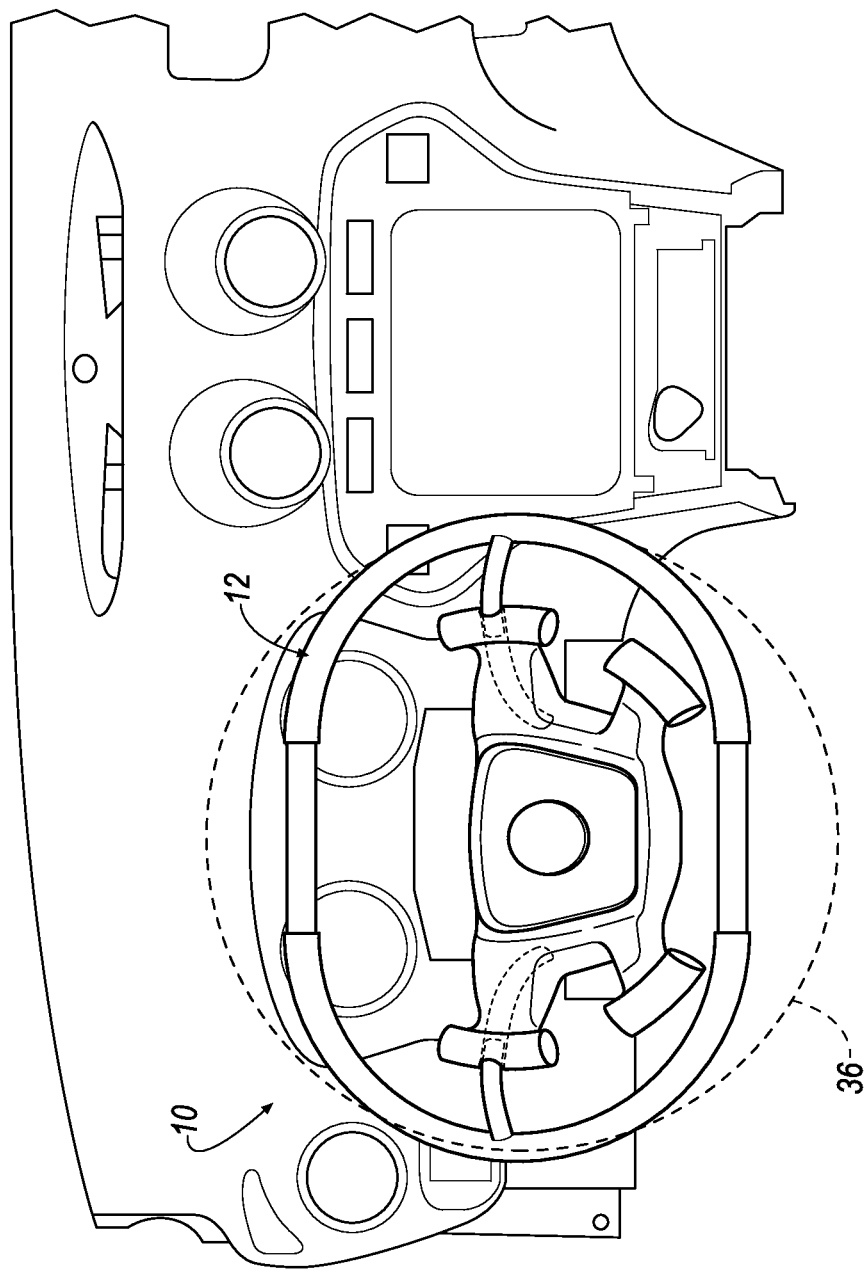

FIG. 7 provides a perspective view of the steering wheel system of FIG. 1 where the steering wheel is in an extended state and a passive restraint has been deployed.

DETAILED DESCRIPTION

Disclosed herein and illustrated in the various figures is an extensible steering wheel system 10. An extensible steering wheel 12 includes extensible support arms 22 and extension members 34, whereby the steering wheel 12 may be extended to provide a greater reaction surface for a passive restraint, e.g., airbag, 36, then would be provided by an extended steering wheel 12.

Figure 2:
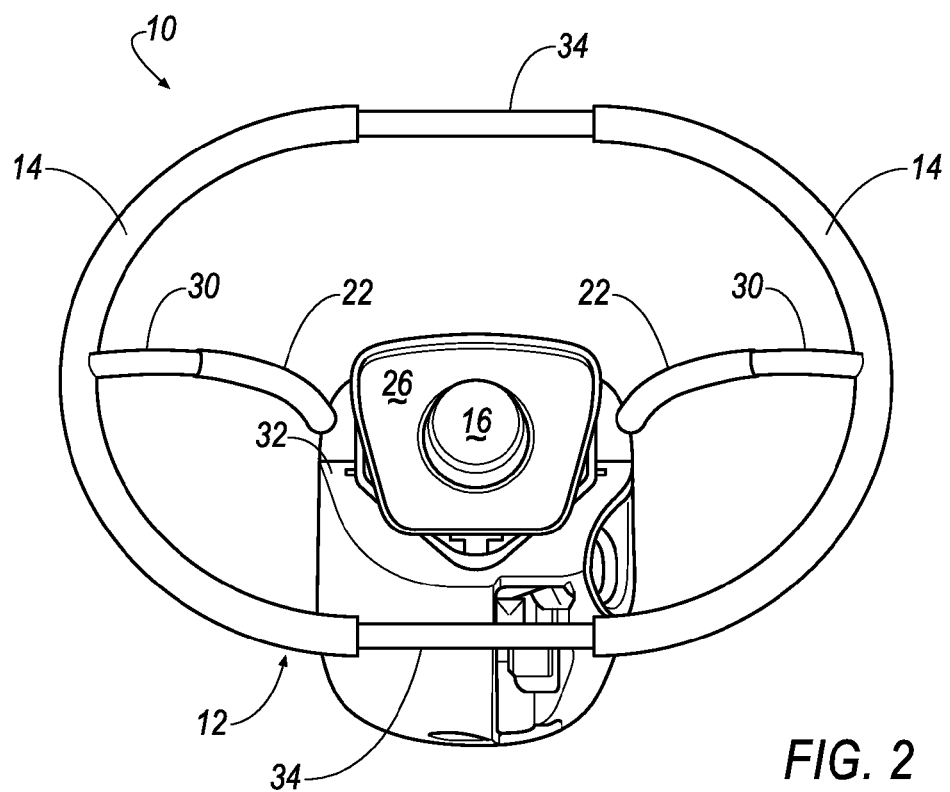

FIG. 1 is a perspective view of an example of a steering wheel system 10, including an extensible steering wheel 12 in a non-extended state, while FIG. 2 is a perspective view of the extensible steering wheel system 10 of FIG. 1 illustrating the extensible steering wheel 12 in an extended state. As illustrated in FIG. 1, in a non-extended state the steering wheel 12 includes two steering wheel sections 14 connected or joined at a joint 24. Extensible support arms 22 mount the steering wheel 12 on a steering column assembly 32, which includes a steering column 16 and a steering wheel cover support 26. Although two support arms 22 are shown in the present illustrations, additional support arms 22 are possible. Further, steering wheel sections 14 are shown as two half-pieces of the steering wheel 12, but could include more than two sections 14. In general, each steering wheel section 14 requires at least one support arm 22, but could be supported by more than one support arm 22. A support arm 22 may be attached to a steering wheel section 14 using one or more of a variety of known mechanisms, e.g., glue, bolts, welds, etc.

The arms 22 may be mounted on the assembly 32 in a conventional manner, e.g., using bolts, welds, or the like. However, as seen in FIG. 2, the support arms 22 may include respective support arm extensions 30. Likewise, the steering wheel 12 may include two or more extension members 34. In general, an extension member 34 is provided for each joint 24 between steering wheel sections 14. The arm extensions 30 and extension members 34 are generally tubular to match a shape of the steering wheel sections 14 and support arms 22. Further, arm extensions 30 and extension members 34 may be formed of any resilient, flexible, material providing sufficient strength and flexibility for the steering wheel system 10 to perform as disclosed herein. For example, extensions 30 and/or extension members 34 could be formed of rubber, plastic, etc.

Figure 3:
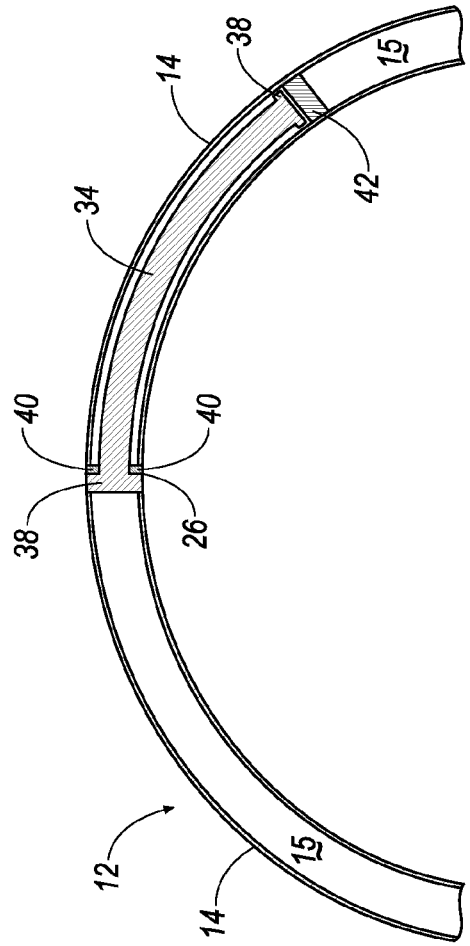
FIG. 3 is a cross-sectional view of a portion of a steering wheel of the system of FIG. 1 in a non-extended state.
Figure 4:
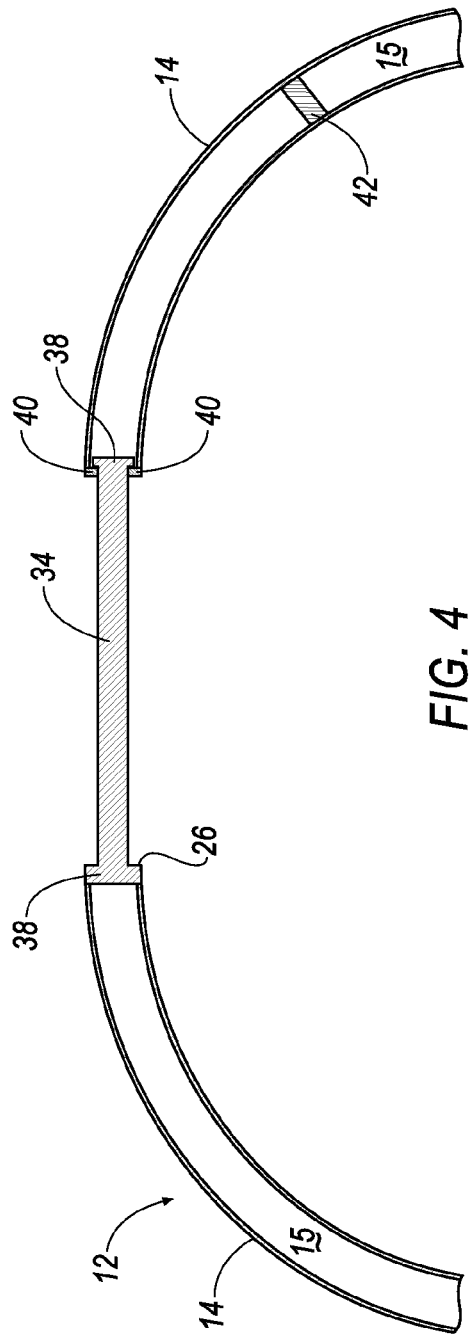
FIG. 4 is a cross-sectional view of a portion of a steering wheel of the system of FIG. 1 in an extended state.

Various mechanisms may be used to trigger a transition of the steering wheel 12 from a non-extended state, such as is shown in FIG. 1, to an extended state, such as is shown in FIG. 2. Further, FIGS. 3 and 4 provide cross-sectional views of a portion of the steering wheel 12 in a non-extended state, and an extended state, respectively. As seen in FIGS. 3 and 4, a wall of each steering wheel section 14 may define a generally tubular interior cavity 15, each cavity 15 accommodating at least a portion of a member 34. Further, the members 34 are generally formed to be accommodated within a cavity 15, i.e., a diameter of a tubular member 34 is generally close, e.g., within a millimeter or less, to a diameter of a tubular cavity 15.

Moreover, the members 34 may include flanged ends 38. A first flanged end 38 of a member 34 may be affixed to an end of a first steering wheel section 14, e.g., using glue or other bonding, such that the flanged and 38, and hence the member 34, remains securely affixed to the section 14 when the steering wheel 12 transitions from a non-extended to an extended state. A second flanged end 38 of the number 34 may be retained in a second section 14 of the steering wheel 12 by a circumferential lip 40 when the steering wheel 12 transitions from a non-extended to an extended state. Accordingly, the lip 40 may limit an extension of the steering wheel 12, thus providing a shape of the extended steering wheel 12 to support a passive restraint 36 (see FIG. 7), e.g., an airbag.

Although not illustrated in separate drawings to avoid duplication, the support arms 22 may include structures similar to the lip 40 for retaining a flange or the like of a support arm extension 30 when the steering wheel 12 transitions from a non-extended to an extended state. Alternatively or additionally, an end of a support arm extension 30 may be securely affixed to a steering wheel section 14 or the steering column assembly 32 such that a bond affixing the extension 30 is not broken when the steering wheel 12 transitions from a non-extended to an extended state.

In addition to accommodating at least a portion of a member 34, a cavity 15 may also accommodate a triggering mechanism 42. For example, a triggering mechanism 42 may include a gyro device such as is known, a loaded spring, or some other mechanical device biased against an end of the member 34. A controller or the like in a vehicle, e.g., an airbag controller, etc., may be used to actuate the triggering mechanism 42, thereby causing the sections 14 to separate at the joint 24. For example, a controller could generate a signal for the triggering mechanism 42 using a crash detection algorithm utilizing crash data measured from a vehicle based sensor, such as is known. Such controllers are generally known as including a processor and a memory, the memory storing program instructions executable by the processor, e.g., here a controller could include programming for determining when to provide instructions to trigger a mechanism 42 and/or other separation mechanism. Instructions such as a signal to actuate the triggering mechanism 42 could be communicated via a Controller Area Network (CAN) bus or similar communications mechanism in a vehicle.

As an alternative, or in addition, to the triggering mechanism 42, other separation mechanisms could be used to cause breakage of the joint 24 and extension of the steering wheel 12. For example, a portion of gas used by the inflator system of a steering wheel airbag could be directed into a cavity 15, and used to push a member 34, thereby breaking the joint 24. Yet further, the joint 24 could include an adhesive, glue, or other bond that dissolved or lost adhesive force upon application of high heat. In this example, a member 34 could be pretensioned with a loaded spring or the like, and the triggering mechanism could ignite a burning to break the joint 24, whereupon the pretensioning mechanism, e.g., the loaded spring, could force the members 34 to deploy and the steering wheel 12 to thereby extend.

In general, the controller is configured to trigger extension of the steering wheel 12 prior to deployment of an airbag 36 (see FIG. 7) or the like. For example, a steering wheel 12 may be extended within substantially the first 20 milliseconds that an oblique impact is detected, whereupon an airbag 36 could then be deployed.

In any case, the joint 24 is generally configured to be broken by a predetermined pressure, e.g., a pressure resulting from actuation of the triggering mechanism 42. For example, sections 14 may be glued or otherwise bonded to one another at a joint 24. A strength of the glue or other bond may be calibrated to retain the steering wheel 12 in a non-extended state absent a force exerted by actuation of the triggering mechanism 42. The triggering mechanism 42, in turn, may be configured to cause a force greater than the bonding force at the joint 24 when the triggering mechanism 42 is actuated, thereby breaking the joint 24 and transitioning the steering wheel 12 from a non-extended state to an extended state.

Figure 5:
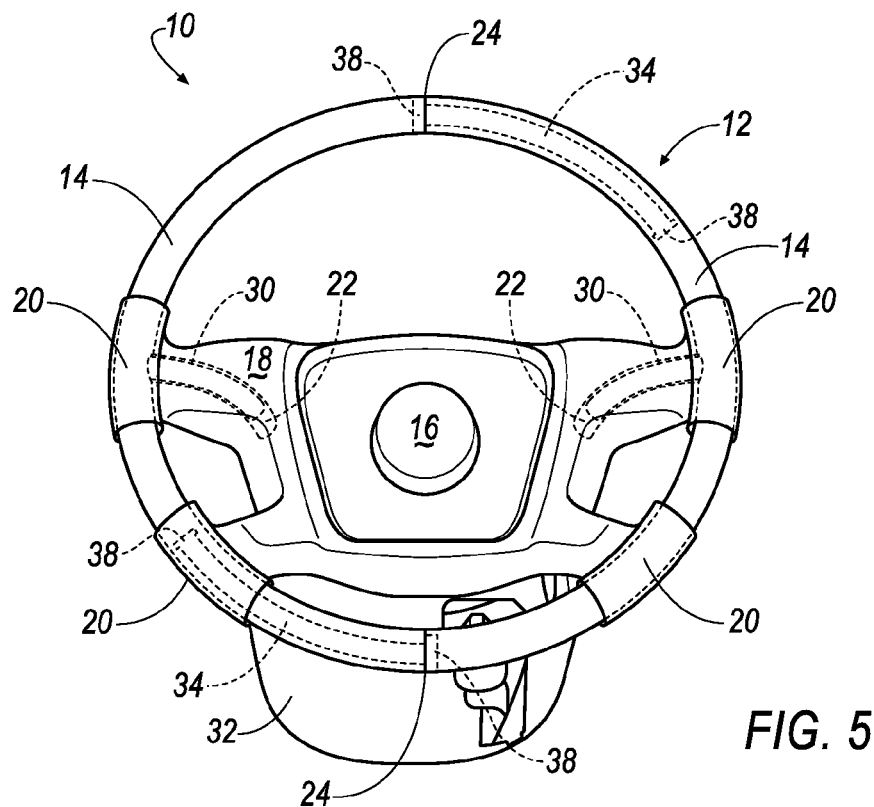
FIG. 5 illustrates a perspective view including further example elements of the system of FIG. 1, with the steering wheel in a non-extended state.

FIG. 5 is a perspective view of an example of the steering wheel system 10 of FIG. 1 including an extensible steering wheel 12 in a non-extended state. FIG. 5 illustrates a perspective view including further example elements of the system 10, including a steering wheel hub cover 18 that may be fitted over the steering wheel cover support 26 (not visible in FIG. 5). As is known, a compartment formed by the wheel hub cover 18 and steering wheel cover support 26 may include various components, including a passive restraint such as an airbag, e.g., a (DAB). Alternatively or additionally, an airbag may be deployed from a steering column 16. Other components may be housed in a compartment formed by the cover 18 and cover support 26, such as a vehicle electronics or the like.

Figure 6:
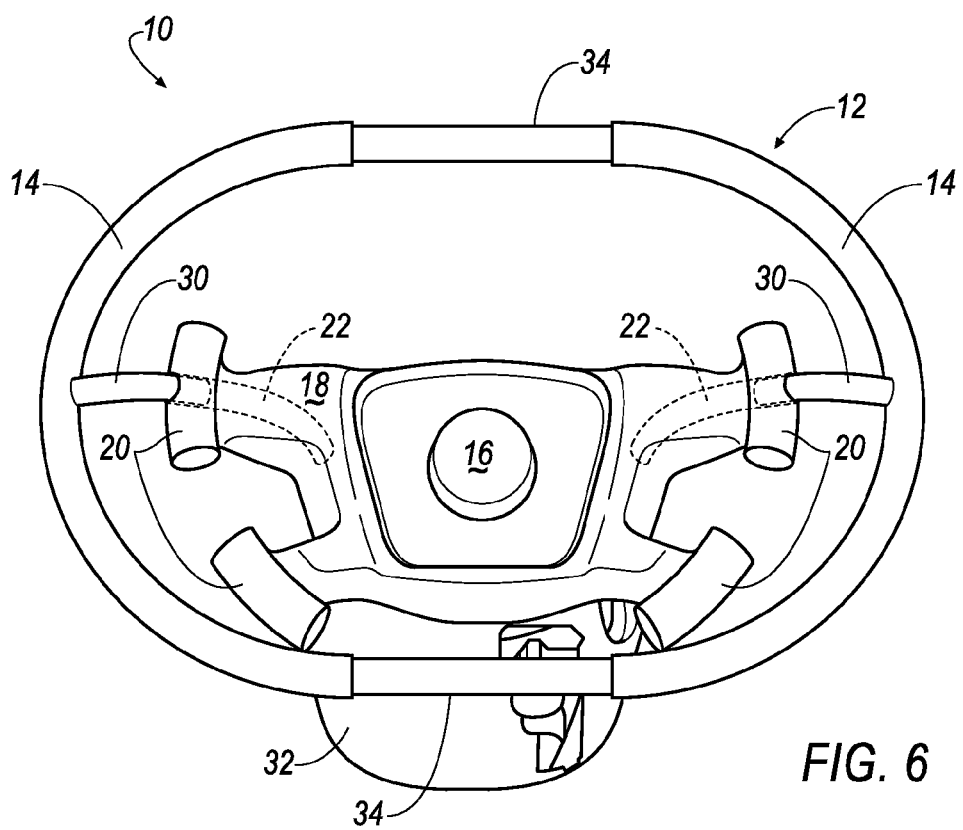
FIG. 6 illustrates a perspective view including further example elements of the system of FIG. 1, with the steering wheel in an extended state.

In any event, the cover support 26 may include tear grips 20, e.g., molded plastic or the like fitted around the steering wheel 12. As illustrated in FIG. 6, the tear grips 20 are generally configured to break when the triggering mechanism 42 causes the steering wheel sections 14 to be pushed apart, and the member 34 as well as the support arm extensions 30, to be deployed. Alternatively or additionally, some other portion of the wheel hub cover 18 and/or the cover support 26 may be configured to break when the steering wheel 12 transitions from a non-extended state to an extended state.

FIG. 7 provides a perspective view of the steering wheel system 10 of FIG. 1 where the steering wheel 12 is in an extended state and a passive restraint, in this case, an airbag, e.g., a DAB, 36 has been deployed. This can be seen, the extended steering wheel 12 provides support for the airbag 36 even at edges thereof. Accordingly, a driver head and/or other body part striking the airbag 36 will be better protected in an oblique impact, because the airbag 36 will be supported at edges thereof. Thus, the presently disclosed system 10 provides the advantage of enhancing driver safety in an oblique impact situation. A further advantage is that parameters for installing and deploying a passive restraint such as a driver-side airbag need not be changed to use the system 10 and achieve enhanced driver safety.

In addition to the steering wheel system 10 disclosed herein, it should be understood that a process for extending the steering wheel 12 and/or deploying a passive restraint 36 is also disclosed herein. For example, upon detection of an oblique impact by a controller of a vehicle, e.g., as discussed above, the triggering mechanism 42 may actuate, whereby a pressure or force may be exerted on a member 34 within a steering wheel section 14 cavity 15. Moreover, as discussed above, a joint 26 between steering wheel sections 14 will be broken upon application of an appropriate force, resulting in deployment of a member 34 stored in one or more section 14 cavities 15, as well as deployment of a support arm extension 30 stored in a support arm 22. Once the member 34 and support arm extension 30 are deployed, the steering wheel 12 has transitioned from a non-extended state to an extended state.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An apparatus, comprising:
a plurality of steering wheel sections that can be joined to form a steering wheel;
a member partially disposed within a first steering wheel section cavity and partially disposed within a second steering wheel section cavity;
a plurality of support arms; each of the support arms having disposed therein a support arm extension; and
at least one separation mechanism configured to break a joint between first and second steering wheel sections;
wherein the support arm extensions are configured to extend between the support arms and the steering wheel sections when the steering wheel is in an extended state.

2. The apparatus of claim 1, further comprising a passive restraint.

3. The apparatus of claim 2, further comprising a controller that, upon detection of an oblique impact, is programmed to trigger the separation mechanism and then deploy the passive restraint.

4. The apparatus of claim 1, wherein the steering wheel transitions from a non-extended state to the extended state when the separation mechanism is triggered.

5. The apparatus of claim 1, wherein the member includes a flanged first end.

6. The apparatus of claim 5, wherein at least one first end of the steering wheel cavity includes a lip configured to retain the flanged first end of the member.

7. The apparatus of claim 1, wherein the steering wheel sections comprise more than two steering wheel sections.

8. The apparatus of claim 1, wherein the joint is configured to break upon a predetermined pressure.

9. An apparatus, comprising:
a plurality of steering wheel sections that form a steering wheel;
a plurality of joints at which respective steering wheel sections are joined;
a plurality of members, each of the members being disposed in part in a first one of the steering wheel sections and in part in a second one of the steering wheel sections;
a plurality of support arms, each of the support arms attached to one of the steering wheel sections;
a plurality of support arm extensions, each of the support arm extensions being disposed at least in part in one of the support arms; and
a separation mechanism configured to exert a force to separate the steering wheel sections at the joints, thereby transitioning the steering wheel from a non-extended state to an extended state;
wherein the support arm extensions are configured to extend between the support arms and the steering wheel sections when the steering wheel is in the extended state.

10. The apparatus of claim 9, wherein the separation mechanism is disposed in a cavity of at least one steering wheel section.

11. The apparatus of claim 9, wherein the separation mechanism includes at least one of a spring, gas from an airbag inflator, and a pyro-mechanical device.

12. The apparatus of claim 9, wherein the members have a substantially tubular cross-section.

13. The apparatus of claim 9, further comprising a passive restraint.

14. The apparatus of claim 13, wherein the steering wheel is configured to support the passive restraint in the extended state.

15. The apparatus of claim 13, further comprising a controller that, upon detection of an oblique impact, is programmed to trigger the separation mechanism and then deploy the passive restraint.

16. The apparatus of claim 9, wherein the steering wheel sections comprise more than two steering wheel sections.

17. The apparatus of claim 9, wherein at least one member includes a flanged first end.

18. The apparatus of claim 17, wherein a cavity of at least one first end of one of the steering wheel sections includes a lip configured to retain the flanged first end of the member.

19. The apparatus of claim 17, wherein the flanged first end is bonded to a cavity of one of the steering wheel sections.

20. The apparatus of claim 9, wherein at least one of the joints is configured to break upon a predetermined pressure.

* * * * *